United States Patent
Bell, Jr. et al.

(10) Patent No.: US 8,495,636 B2
(45) Date of Patent: *Jul. 23, 2013

(54) PARALLELIZING SINGLE THREADED PROGRAMS BY PERFORMING LOOK AHEAD OPERATION ON THE SINGLE THREADED PROGRAM TO IDENTIFY PLURALITY OF INSTRUCTION THREADS PRIOR TO EXECUTION

(75) Inventors: Robert H. Bell, Jr., Austin, TX (US); Louis Bennie Capps, Jr., Georgetown, TX (US); Michael A. Paolini, Austin, TX (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

This patent is subject to a terminal disclaimer.

(21) Appl. No.: 11/959,906

(22) Filed: Dec. 19, 2007

(65) Prior Publication Data

US 2009/0165016 A1    Jun. 25, 2009

(51) Int. Cl.
   *G06F 9/46*        (2006.01)
(52) U.S. Cl.
   USPC ............... 718/102; 718/1; 718/100; 718/107
(58) Field of Classification Search
   USPC ........................................ 718/100, 102, 107, 1
   See application file for complete search history.

(56) References Cited

U.S. PATENT DOCUMENTS

| | | | | |
|---|---|---|---|---|
| 6,725,448 B1 * | 4/2004 | Moriya et al. | ................ | 717/119 |
| 6,961,935 B2 * | 11/2005 | Torii | .............................. | 718/100 |
| 7,346,902 B2 * | 3/2008 | Dutt et al. | ..................... | 717/149 |
| 7,458,065 B2 * | 11/2008 | Sanchez et al. | ............... | 717/131 |
| 2003/0074653 A1 * | 4/2003 | Ju et al. | ......................... | 717/154 |
| 2005/0027941 A1 * | 2/2005 | Wang et al. | .................. | 711/121 |
| 2006/0004988 A1 | 1/2006 | Jordan | | |
| 2006/0005194 A1 * | 1/2006 | Kawahara et al. | ........... | 718/100 |
| 2006/0059485 A1 | 3/2006 | Onufryk et al. | | |
| 2006/0095905 A1 | 5/2006 | Courchesne et al. | | |
| 2006/0212677 A1 * | 9/2006 | Fossum | ............................ | 712/1 |

OTHER PUBLICATIONS

Intel, A. Gonzalez, Speculative Threading: Creating New Methods of Thread-Level Parallelization, Dec. 2005, http://web.archive.org/web/*/http://www.intel.com/technology/magazine/research/speculative-threading-1205.pdf.
Zdnet News, S. Shankland, Sun puts 16 cores on its 'Rock' chip, Dec. 8, 2006 http://web.archive.org/web/20080906133755/http://http://news.zdnet.com/2100-9584_22-6141961.html.

* cited by examiner

*Primary Examiner* — Jennifer To
*Assistant Examiner* — Abu Z Ghaffari
(74) *Attorney, Agent, or Firm* — Terrile, Cannatti, Chambers & Holland LLP; Stephen A. Terrile (57) ABSTRACT

A method and apparatus for speculatively executing a single threaded program within a multi-core processor which includes identifying an idle core within the multi-core processor, performing a look ahead operation on the single thread instructions to identify speculative instructions within the single thread instructions, and allocating the idle core to execute the speculative instructions.

9 Claims, 4 Drawing Sheets

PARALLELIZING SINGLE THREADED PROGRAMS BY PERFORMING LOOK AHEAD OPERATION ON THE SINGLE THREADED PROGRAM TO IDENTIFY PLURALITY OF INSTRUCTION THREADS PRIOR TO EXECUTION

BACKGROUND OF THE INVENTION

1. Field of the Invention

The present invention relates to parallelizing execution of single-threaded programs on a multiprocessor system.

2. Description of the Related Art

In multi-core computer systems, different system resources (such as CPUs, memory, I/O bandwidth, disk storage, etc.) are each used to operate on multiple instruction threads. Challenges associated with efficiently operating these multi-core computer systems only increase as the number and complexity of cores in a multiprocessor computer grows.

One issue relating to the use of multi-core integrated circuits is that it often is difficult to write software to take advantage of the multiple cores. To take advantage of the multi-core processors, tasks often need to be divided into threads, and the threads often need to be distributed onto available cores. One issue relating to dividing and distributing the threads is how to efficiently use the cores if there are not enough threads to keep all of the cores occupied. As the number and type of cores increase, there will be an opportunity to use spare cores in a more intelligent way.

SUMMARY OF THE INVENTION

In accordance with the present invention, a multi-core process is set forth in which "spare" or idle cores executing code speculatively are used to speed up single thread tasks. Using code analysis to look ahead in the code, the spare cores speculatively execute any code that may be dependency free, and store the result. Such a process essentially allows the main thread of execution to skip instructions when that section of code is reached. More specifically, the multi-core processor uses spare cores to execute, in parallel, separate parts of a single-threaded program.

In one embodiment, the single-threaded program is compiled as if it would execute on a uniprocessor. An operating system splits the single-threaded program into parts at logical boundaries, manages and orchestrates the execution of the separate program parts on the various cores of the multiprocessor.

In one embodiment, a compiled single-threaded program is broken into pieces by a single-thread optimization system at function boundaries, instruction block boundaries, or at dynamic linking library (DLL) boundaries that are relocatable and need address fixups. The code pieces are composed into a graph of non-speculative main threads and speculative sub-threads and executed in parallel on separate cores. The results are combined and the sub-threads re-executed if conflicts in registers or memory location results occur. Hardware or interrupt mechanisms within the multi-core processor are used to store memory accesses in the sub-thread for results comparison.

In another embodiment, the invention relates to a method for executing a single threaded program within a multi-core processor which includes identifying an idle core within the multi-core processor, performing a look ahead operation on instructions of the single threaded program to identify a plurality of instruction threads within the single threaded program, allocating the idle core to execute at least some of the plurality of instruction threads, and executing the at least some of the instruction threads on the idle core.

In another embodiment, the invention relates to an apparatus for executing a single threaded program within a multi-core processor which includes means for identifying an idle core within the multi-core processor, means for performing a look ahead operation on instructions of the single threaded program to identify a plurality of instruction threads within the single threaded program, means for allocating the idle core to execute at least some of the plurality of instruction threads, and means for executing the at least some of the instruction threads on the idle core.

In another embodiment, the invention relates to a multi-core processor system which includes a plurality of processor cores and a memory which stores a single threaded optimization module. The single threaded program optimization module includes instructions executable by the multi-core processor for identifying an idle core from the plurality of cores within the multi-core processor, performing a look ahead operation on instructions of the single threaded program to identify a plurality of instruction threads within the single threaded program, allocating the idle core to execute at least some of the plurality of instruction threads and executing the at least some of the instruction threads on the idle core.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and program are disclosed for using spare cores under operating system control to split a single thread for parallel execution onto multiple cores. In one embodiment, there is an optimization system which manages executing programs on a multiprocessor which includes more than one core. The optimization system orchestrates how the parts of the program are executed, manages which are speculative, and determines if speculative execution conflicts occur.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
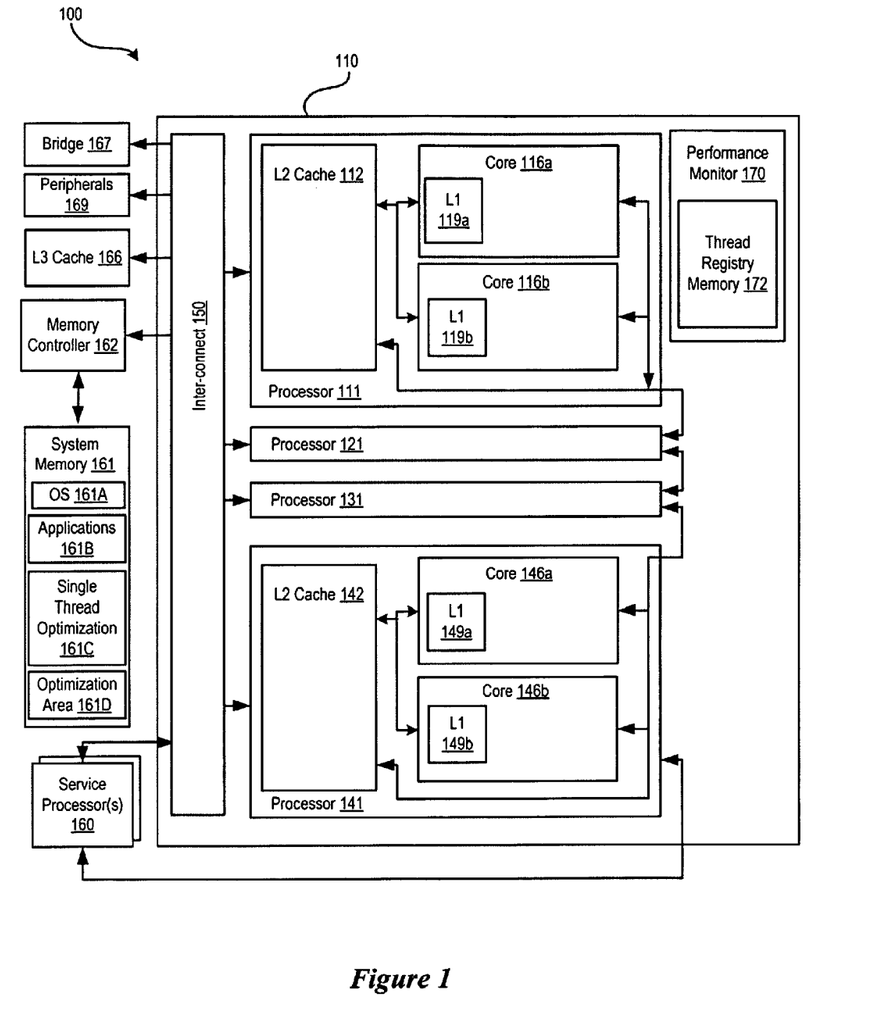
FIG. 1 illustrates a multi-processor computer architecture in which selected embodiments of the present invention may be implemented.

Referring now to FIG. 1, there is illustrated a high-level block diagram of a multiprocessor (MP) data processing system 100 that provides improved execution of single thread programs in accordance with selected embodiments of the present invention. The data processing system 100 has one or more processing units arranged in one or more processor groups, and as depicted, includes four processing units 111, 121, 131, 141 in processor group 110. In a symmetric multiprocessor (SMP) embodiment, all of the processing units 111, 121, 131, 141 are generally identical, that is, they all use a common set or subset of instructions and protocols to operate, and generally have the same architecture. As shown with processing unit 111, each processing unit may include one or more processor cores 116a, 116b which carry out program instructions in order to operate the computer. An exemplary processing unit would be the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture. Additionally, multiple processing units and/or multiple cores may be included within a single integrated circuit chip.

As further depicted in FIG. 1, each processor core 116a, 116b includes an on-board (L1) cache memory 119a, 119b (typically, separate instruction and data caches) that is constructed from high speed memory devices. Caches are commonly used to temporarily store values that might be repeatedly accessed by a processor, in order to speed up processing by avoiding the longer step of loading the values from system memory 161. A processing unit can include another cache such as a second level (L2) cache 112 which, along with a cache memory controller (not shown), supports both of the L1 caches 119a, 119b that are respectively part of cores 116a and 116b. Additional cache levels may be provided, such as an L3 cache 166 which is accessible via system interconnect or fabric bus 150. Each cache level, from highest (L1) to lowest (L3) can successively store more information, but at a longer access penalty. For example, the on-board L1 caches (e.g., 119a) in the processor cores (e.g., 116a) might have a storage capacity of 128 kilobytes of memory, L2 cache 112 might have a storage capacity of 4 megabytes, and L3 cache 166 might have a storage capacity of 132 megabytes. To facilitate repair/replacement of defective processing unit components, each processing unit 111, 121, 131, 141 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 150. Fabric bus 150 is connected to one or more service processors 160, a system memory device 161, a memory controller 162, a shared or L3 system cache 166, and/or various peripheral devices 169. A processor bridge 167 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads.

The system memory device 161 (random access memory or RAM) stores program instructions and operand data used by the processing units, in a volatile (temporary) state, including the operating system 161A and application programs 161B. Single thread optimization module 161C may be stored in the system memory in any desired form, such as an operating system module, Hypervisor or supervisor component, etc, and is used to optimize the execution of a single threaded program across multiple cores of the processor units. Although illustrated as a facility within system memory, those skilled in the art will appreciate that single thread optimization module 161C may alternatively be implemented within another component of data processing system 100. The single thread optimization module 161C is implemented as executable instructions, code and/or control logic including programmable registers which is operative to check performance monitor information for code running on the system 100, to assign priority values to the code using predetermined policies, and to tag each instruction with its assigned priority value so that the priority value is distributed across the system 100 with the instruction, as described more fully below.

The processor group 110 also includes a performance monitor 170, which includes a corresponding thread registry memory 172. The performance monitor 170 and thread registry memory 172 are used by the single thread optimization module 161C when optimizing execution of a single threaded program. System memory 161 also includes an optimization area 161D that may be used for storage of register values by threads and is accessible to optimization module 161C.

Figure 2:
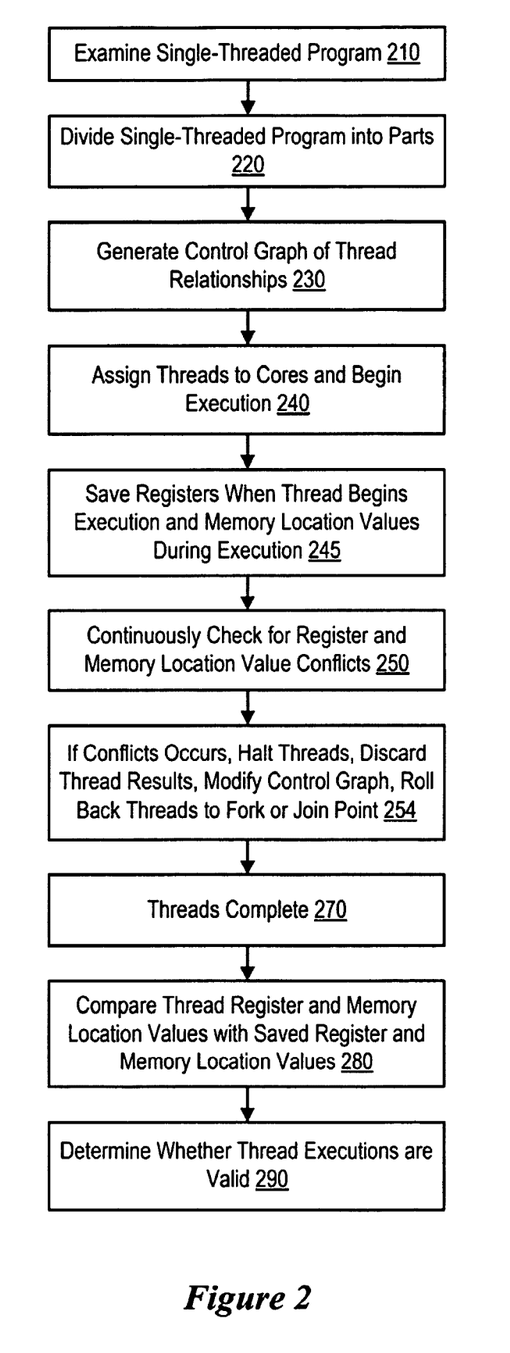
FIG. 2 shows a flow chart of a single thread optimization program.

FIG. 2 shows a flow chart of the operation of the single thread optimization module 161C. More specifically, in operation, a compiled single-threaded program ready for execution is examined by the optimization module 161C at step 210.

Next at step 220, the single threaded program is divided into a hierarchy of threads (e.g., a main, i.e. parent, thread and at least one sub-thread, i.e. child thread) at functions in the code that are relocatable and require code fix-ups, such as program DLLs, function calls, basic block boundaries, or superblock boundaries.

An exact control graph of the relationships between threads is prepared and maintained by the optimization module at step 230. The graph includes a definition of the instructions in the main and sub-threads, the fork points where sub-threads begin execution, and join or wait points where main thread and sub-threads converge. Sub-threads may themselves contain sub-threads.

At step 240, optimization module 161C assigns and executes main threads and sub-threads in parallel on separate cores based on the relationships between threads in the graph. In certain embodiments, thread registry memory 172 in the performance monitor 170 dynamically records the addresses accessed by the main or parent thread and sub-threads and the changes of values in those locations in the order in which they occur. After or during execution of the threads, optimization module 161C can retrieve the list of addresses that were read from or written to by the threads. In alternate embodiments, each load and store in the main or parent thread and sub-thread causes a trap to thread registry memory 172 to record the address of an access.

In step 245, when a main or sub-thread is initiated to begin execution, the register values of the thread are saved in an optimization area 161D. A sub-thread may execute on the same core or on a different core than its parent thread. The sub-thread may be assigned to a core before the parent thread begins execution, i.e. assigned statically to a core, and then may begin execution in parallel with the parent thread, or it may be assigned dynamically to a core and initiated at some point during the parent thread execution. When the sub-thread is assigned to another core, the program text for the sub-thread may need to be copied to the optimization area 161D using a copy mechanism such as DMA, or the program text and data may be naturally accessible through the interconnect fabric of the multiprocessor system without explicit copy. In both cases, the contents of the registers in the parent thread are copied to the optimization area so that the core that will initiate execution of the sub-thread may access them. In all cases, the parent thread context, that is, the registers and memory, are available to the sub-thread and associated with the registers and memory locations that will be accessed by the sub-thread either by explicit instruction copy or DMA copy from system memory 161, or by hardware accessibility into the optimization area 161D.

Optimization module 161C continuously checks for register and memory address access conflicts at step 250 during main thread and sub-thread execution. Register conflicts may occur when the sub-thread writes a new value to a register that is used by the main thread while the sub-thread executes but which is not restored to the old value by the sub-thread when the sub-thread completes. There are two ways that optimization module 161C determines if register conflicts occur. First, analysis of the instructions in the thread execution graph formed in step 230 can determine if some register conflicts will occur. Second, the main thread register values that were saved in the optimization area 161D at initiation of the sub-thread at step 245 are compared to the sub-thread register values that were saved in the optimization area 161D when it completes at step 270. Optimization module 161C determines memory location conflicts by continuously comparing the memory write addresses by main or parent thread and sub-thread as they are stored in thread register memory 172. A conflict occurs if the write address is used by the threads but in incorrect program order. Program order is determined by analyzing the threads' instructions in the graph.

At step 254, if conflicts occur during execution of the main or sub-thread, the optimization module 161C causes the halt of the main or sub-thread, discards the results from the main or sub-thread execution by restoring the correct register values that were saved in optimization area 161D and the correct memory location values that were saved in the thread registry memory 172, changes the thread execution relationships in the control graph if necessary, and restarts the main or sub-thread. Execution of the main or sub-thread begins again at step 245.

Next, at step 270 the sub-thread finishes execution by reaching a join or wait point in the control graph. The sub-thread indicates to the optimization module whether or not the sub-thread could complete based on whether the sub-thread overran the thread registry memory 172 in the performance monitor 170. When the main or parent thread reaches an instruction associated with a join or wait statement in the graph that requires results from the sub-thread execution but the sub-thread has not reached the same point, the parent thread suspends its own execution until the sub-thread completes or reaches a point in the graph at which it can provide results.

At step 280, the optimization module 161C compares the registers read and written by the sub-thread with the registers read and written by the main or parent thread by analyzing the execution graph and examining the register values saved in the optimization area 161D. It also compares the modified memory locations for the sub-thread that were saved in the thread registry memory 172 against the same relative locations registered in the thread registry memory 172 for the main or parent thread.

The optimization module 161C uses the analysis to determine whether the results of the sub-thread are valid at step 290. In one embodiment, the optimization module 161C performs three checks to determine whether the results of the sub-thread are valid. More specifically, if the sub-thread did not write memory locations read by the main or parent thread after the sub-thread was initiated, and vice-versa, then no conflict occurred. Also, if a first thread did not write registers read by a second thread after the first thread was initiated or if the first thread did write registers but later restored them, i.e. the registers were used properly in correct program order, then no conflict occurred. Also, if the number of memory locations that are read or written does not overrun the thread registry memory 172 for either the main or sub-threads, then the results are valid. If there are no conflicts, the memory locations modified by the sub-thread are merged into the memory locations of the main or parent thread by a series of store operations. It is possible that all register values do not need to be identical after main or parent thread execution. For example, an analysis of the sub-thread could determine that some register values changed in the main or parent thread were not used in the sub-thread, or vice versa. The optimization module 161C could store which registers are of interest before the sub-thread begins execution. If the results are valid, then the optimization module 161C executes the next code in program order in its graph.

Additional optimization of conflict resolution in optimization module 160C is possible in step 290. If a sub-thread is speculative until joined back with the parent thread, then conflicts may not need to be checked if a variable that predicates the execution of that sub-thread turns out to be false. For example, if a parent thread spawns a sub-thread that is only executed based on a calculation comparison or logical test, and the result in the parent thread indicates that the code would not have been executed, then no conflict resolution with the sub-thread registers or memory locations need be carried out, and the memory updates listed by the sub-thread need not be merged into the parent thread memory locations via optimization module 161C.

In certain embodiments, the size of the thread registry memory 172 may be programmable or fixed in the multiprocessor design and is based on statistics of how many addresses are typically accessed for relocated fix up functions, DLLs, basic blocks, or superblocks for a variety of workloads or for specific workloads that are expected to be used on the multiprocessor. There are many cases of large chunks of instructions that will result in few conflicts. For example, in cases where DLLs, functions, or blocks of instructions are used to print out information or change memory locations that are not used until much later in the graph, there will be few, if any, conflicts. Also functions compiled using standard application interface specifications that push and pop registers on a stack will have few register conflicts. Programmers could make use of this framework to improve performance by reducing register or memory location conflicts, but it would not be a programming requirement, which eases the burden of writing multi-threaded code.

By splitting a single-threaded program into main or parent threads and speculative sub-threads and executing them automatically on separate spare cores, much of the inherent parallelism of functions can be extracted. Since programming for a multiprocessor can be challenging, this relieves the programmer of the burden of parallelizing code, and relies only on a trusted distributed operating system to split the code and manage the execution of separate pieces of the code. One important aspect of this process is the automatic splitting of the relocatable code at logical boundaries that can be checked for consistency after parallel execution. This execution model can be understood and used to additional advantage by programmers as they write single-threaded code, but it is not required.

Figure 3:
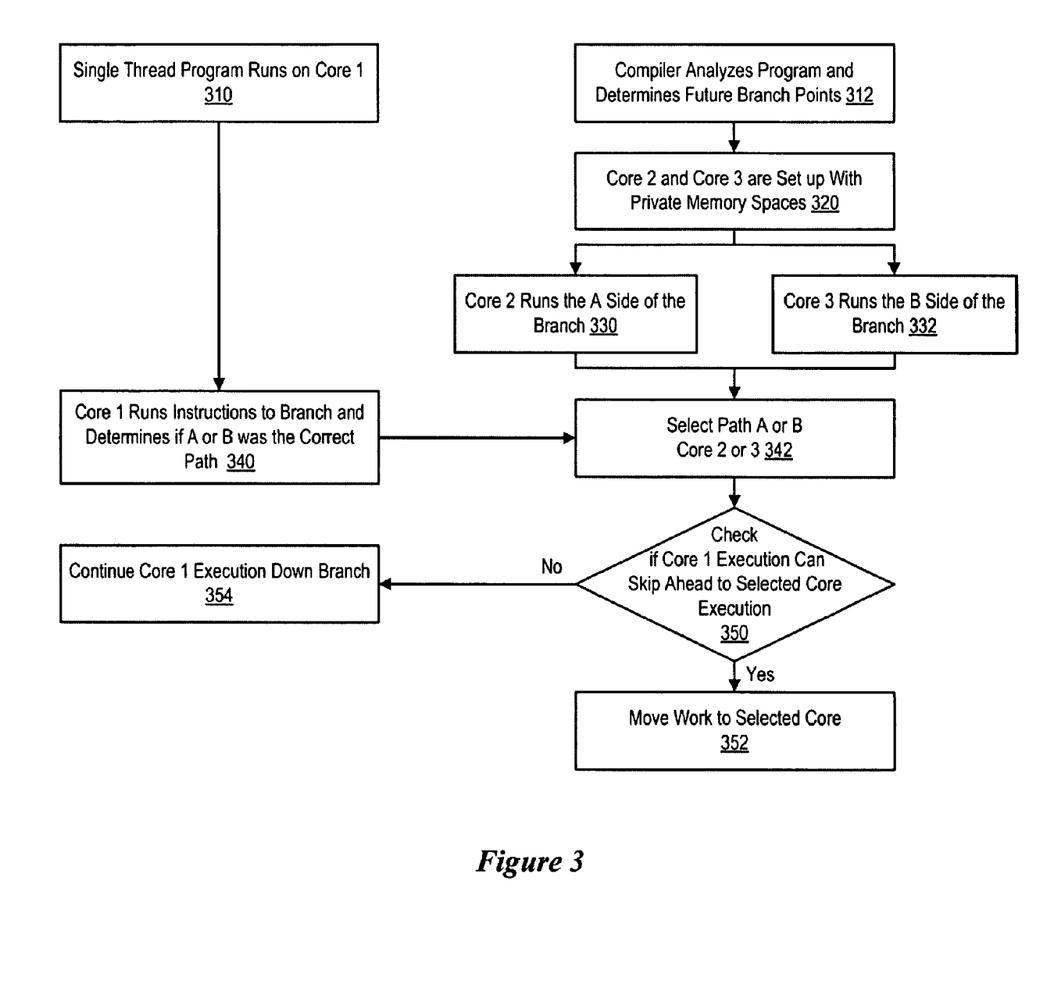
FIG. 3 shows a flow chart of the operation of a system for parallelizing a single threaded program.

Referring to FIG. 3, a flow chart of the operation of the single thread optimization module when used for parallelizing a single threaded program is shown. More specifically, while a single threaded program is executing on a first core of the multiprocessor data processing system 100 (e.g., core 116a) at step 310, a compiler analyzes the program and determines future branch points at step 312. Other cores within the multiprocessor data processing system 100 (e.g., core 116b and 146a) are then configured with private memory spaces at step 320. Next, in an example where the single threaded code includes two sides of a branch (e.g., an A side and a B side) one of the other cores (e.g., core 2) is configured to execute the A side of the branch at step 330 and another core (e.g., core 3) is configured to execute the B side of the branch at step 332.

While these sides of the branch are executing within the cores, the first core executes the instructions to the branch and determines whether the A side of the branch or the B side of the branch was the correct path at step 340. The result of this determination is used to select one of the paths at step 342. Next at step 350, the single thread optimization module 161C checks to determine whether the core 1 execution can skip ahead to a selected core execution (i.e. whether the results of one of the sides of the branch can be used). If so, then the single thread optimization module 161C may continue executing based on the sub-thread results or migrate execution of the parent thread to the selected core at step 352. If not, then the single thread optimization module 161C continues the execution of the single thread within the first core and may reinitiate execution of one or both of sides A and B of the branch at step 354.

Figure 4:
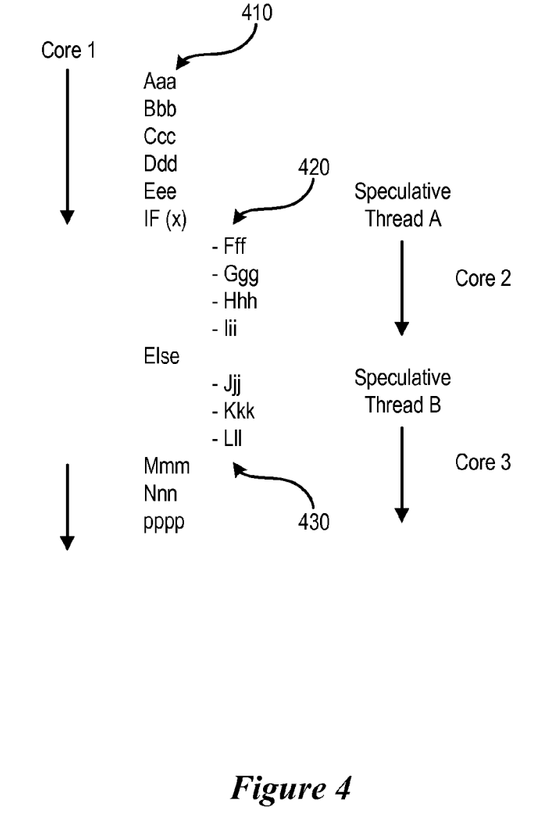
FIG. 4 shows an example of speculative thread pool code.

Referring to FIG. 4, an example of speculative thread pool code is shown. More specifically, the non-speculatively executed code 410 is executed by a first core (core 1). A first speculative thread (thread A 420) is executed by a second core. A second speculative thread (thread B 430) is executed by a third core.

In operation, speculative cores (e.g., cores that are not otherwise executing code) scan ahead for branches or other types of speculative instructions. When a branch is identified, if two cores are allocated to execute respective threads (and if the threads are ready to be executed (e.g., the thread does not rely upon values that have yet to be computed)), then the context is saved until the primary thread reaches the branch and determines which branch is the correct branch with which to proceed. The proper branch results are then merged in with the primary thread results from the saved context and system can then resume scanning for branches and the cycle repeats.

One example of a branch that could be computed ahead might be:

If (debug_on) then log x, y, z.

In this example the logging of data to an I/O device, such as a file or terminal, will not interfere with the parallel usage of the values of x, y and z, and therefore the logging function spawned to a sub-thread will execute on the spare core with essentially no impact to the execution time of the main or parent thread.

Another example of a branch that could be computed ahead might be:

Switch (language)
x: load German; //format left to right
y: load Japanese; //format top to bottom.

In this example there is no variable interaction between sub-threads executing possibly long and complicated loadings of formats. The main or parent thread can carry out additional work and compute the language logical test in parallel with the load of x and y, and at the join when the test is computed the results of one x or y will be merged in with the main or parent thread results with minimal impact to the execution time of the main or parent thread.

Those skilled in the art will appreciate that data processing system 100 can include many additional or fewer components, such as I/O adapters, interconnect bridges, non-volatile storage, ports for connection to networks or attached devices, etc. Because such components are not necessary for an understanding of the present invention, they are not illustrated in FIG. 1 or discussed further herein. However, it should also be understood that the enhancements provided by the present invention are applicable to multi-threaded data processing systems of any architecture and are in no way limited to the generalized MP architecture illustrated in FIG. 1.

For example, the single threaded optimization process could be implemented at the compiler level, at the operating system level, at the hardware level (e.g., by embedding the functionality within the integrated logic circuit or via a hypervisor or some combination of both) or with some combination of the compiler level, the operating system level and the hardware level.

At the compiler level, a compiler could explicitly specify the fork of sub-threads and the join or wait for sub-thread results in the compiled code, i.e., no separate graph would be necessary, and the optimization module hardware as described above, or additional software instructions in the compiled code, would handle the conflict resolution of registers and memory location accesses and the merge of thread results. In addition, the compiler could embed hints or boundary indicators during compilation where the hints could be core specific (e.g., directing certain threads and sub-threads to certain cores) or directed to multi-core processors in general (e.g., if a multi-core processor has an idle core or idle cores, then execute certain threads and sub-threads on the idle core or idle cores). These hints would be backwards compatible and could be ignored by single core processors. The compiler could also provide a profile of the program (e.g., via a graph or by using fork and join compiled code) that is generated at build time. This profile could even be optimized for certain types of multi-core processors (e.g., two-core or four-core type multi-core processors). Additionally, the compiler could also take steps to make independent runs longer and more frequently by grouping all or many dependencies together within a single sub-thread or by rearranging instruction executions in a manner that reduces register and memory access conflicts and is therefore more favorable to speculative execution of threads.

At the operating system and hardware levels, the orchestration of how the parts of the program are executed can be accomplished with or without compiler intervention. For example, at the operating system level, a compiled single-threaded program is broken into pieces by a single thread optimization system, which is included within the operating system at function or dynamic linking library (DLL) boundaries. The operating system then generates a graph of non-speculative main or parent threads and speculative sub-threads, and the data processing system then executes the main or parent threads and sub-threads in parallel on separate cores. The operating system would manage conflicts and merge results explicitly through additional software with or without hardware assistance.

Additionally, the main or parent threads and sub-threads may be executed across multiple cores within a single data processing system, across multiple processing units within a single data processing system, across multiple data processing systems (e.g., controlled via a distributed operating system), or some combination of multiple cores, multiple processing units and multiple data processing systems.

Consequently, the invention is intended to be limited only by the spirit and scope of the appended claims, giving full cognizance to equivalents in all respects.

What is claimed is:

1. A method for executing a single threaded program within a multi-core processor comprising:
    identifying an idle core within the multi-core processor, the identifying the idle core comprising identifying a main thread and a plurality of sub-threads from the plurality of instruction threads of the single threaded program, at least one of the plurality of sub-threads being a speculatively executable instruction thread, the identifying the main thread and the plurality of sub-threads being prior to executing instructions of the single threaded program;
    performing a look ahead operation on the instructions of the single threaded program prior to executing the instructions, the look ahead operation identifying a plurality of instruction threads within the single threaded program;
    allocating the idle core to execute at least one of the plurality of instruction threads based upon results of the look ahead operation;
    executing the at least one of the instruction threads on the idle core;
    generating a graph of relationships between a plurality of discretely executable components, the graph comprising a main component and a plurality of discretely executable sub-components;
    assigning the main component to execute on the idle core of the multi-core processor;
    assigning each of the plurality of discretely executable sub-components to execute on at least one other idle core of the multi-core processor; and,
    managing conflicts between each of the plurality of discretely executable components based upon information determined from the graph prior to the assigning.

2. The method of claim 1, wherein:
    the identifying the idle core further comprises identifying the plurality of instruction threads via a Hypervisor at function boundaries.

3. The method of claim 1, further comprising:
    if conflicts occur, discarding results from processing a particular discretely executable sub-component of the plurality of discretely executable component; and,
    restarting execution of the discretely executable sub-component with register and memory location values generated based upon the main component execution.

4. An apparatus for executing a single threaded program within a multi-core processor comprising:
    means for identifying an idle core within the multi-core processor, the means for identifying the idle core comprising means for identifying a main thread and a plurality of sub-threads from the plurality of instruction threads of the single threaded program, at least one of the plurality of sub-threads being a speculatively executable instruction threads, the identifying the main thread and the plurality of sub-threads being prior to executing the instructions;
    means for performing a look ahead operation on instructions of the single threaded program prior to executing the instructions, the look ahead operation identifying a plurality of instruction threads within the single threaded program;
    means for allocating the idle core to execute at least one of the plurality of instruction threads based upon results of the look ahead operation;
    means for executing the at least one of the instruction threads on the idle core;
    means for generating a graph of relationships between a plurality of discretely executable components, the graph comprising a main component and a plurality of discretely executable sub-components;
    means for assigning the main component to execute on the idle core of the multi-core processor;
    means for assigning each of the plurality of discretely executable sub-components to execute at least one other idle core of the multi-core processor; and,
    means for managing conflicts between each of the plurality of discretely executable components based upon information determined from the graph prior to assigning the main component to execute on the idle core.

5. The apparatus of claim 4, wherein:
    the means for identifying the idle core further comprises a Hypervisor, the Hypervisor identifying the plurality of instruction threads based upon function boundaries.

6. The apparatus of claim 4, further comprising:
    means for discarding results from processing a particular discretely executable sub-component of the plurality of discretely executable component if conflicts occur; and,
    means for restarting execution of the discretely executable sub-component with register and memory location values generated based upon the main component execution.

7. A multi-core processor system comprising:
    a plurality of processor cores;
    a memory, the memory storing a single threaded optimization module, the single threaded program optimization module comprising instructions executable by the multi-core processor for
        identifying an idle core from the plurality of cores within the multi-core processor, the identifying the idle core comprising identifying a main thread and a plurality of sub-threads from the plurality of instruction threads of the single threaded program, at least one of the plurality of sub-threads being a speculatively executable instruction thread, the identifying the main thread and the plurality of sub-threads being prior to executing instructions of the single threaded program;

performing a look ahead operation on instructions of the single threaded program prior to executing the instructions, the look ahead operation identifying a plurality of instruction threads within the single threaded program;

allocating the idle core to execute at least one of the plurality of instruction threads based upon results of the look ahead operation;

executing the at least one of the instruction threads on the idle core;

generating a graph of relationships between a plurality of discretely executable components, the graph comprising a main component and a plurality of discretely executable sub-components;

assigning the main component to execute on the idle core of the multi-core processor;

assigning each of the plurality of discretely executable sub-components to execute on at least one other idle core of the multi-core processor; and, managing conflicts between each of the plurality of discretely executable components based upon information determined from the graph prior to the assigning.

8. The multi-core processor system of claim 7, wherein the instructions for identifying the idle core further comprise instructions for:
identifying the plurality of instruction threads via a Hypervisor at function boundaries.

9. The multi-core processor system of claim 7, wherein the single threaded optimization module further comprise instructions for:
discarding results from processing a particular discretely executable sub-component of the plurality of discretely executable component if conflicts occur; and, restarting execution of the discretely executable sub-component with register and memory location values generated based upon the main component execution.

* * * * *